United States Patent [19]

Laurent

[11] 4,092,929
[45] June 6, 1978

[54] TRANSPORT INSTALLATION WITH TRIPLE GRIP FOR COUPLING THE VEHICLES TO HAULAGE CABLES

[75] Inventor: Roger Laurent, Chambery, France

[73] Assignee: POMA 2000 S.A., France

[21] Appl. No.: 750,143

[22] Filed: Dec. 13, 1976

[30] Foreign Application Priority Data

Dec. 31, 1975  France .............................. 75 40392

[51] Int. Cl.² .............................................. B61B 9/00
[52] U.S. Cl. .................... 104/173 R; 104/20; 104/199; 104/202; 104/204; 104/214; 104/224
[58] Field of Search ...................... 104/18, 20, 25, 165, 104/173 R, 178, 202, 204, 214, 184, 211, 199, 224, 140, 141, 173 ST, 203, 205–210, 212, 213, 215–223; 269/152, 154, 156

[56] References Cited

U.S. PATENT DOCUMENTS

| 433,843 | 8/1890 | Yard | 104/214 |
|---|---|---|---|
| 437,110 | 9/1890 | Guerra | 104/214 X |
| 473,221 | 4/1892 | Guerra | 104/217 |
| 608,858 | 8/1898 | Hirt | 104/199 |
| 931,089 | 8/1909 | Robinson | 104/214 X |
| 3,871,303 | 3/1975 | Woodling | 104/173 R |

FOREIGN PATENT DOCUMENTS

295,347  4/1932  Italy ...................................... 104/202

Primary Examiner—Randolph A. Reese
Attorney, Agent, or Firm—Stevens, Davis, Miller & Mosher

[57] ABSTRACT

Transport installation comprising individual passive vehicles each equipped with a triple grip for coupling the vehicle to a main haulage cable extending along the track or to auxiliary haulage cables for instance acceleration and deceleration cables in a station. One pair of jaws of the grip is open when the two other pairs of jaws are in the coupling position and inversely. A change of cable operation is effected by a single control and the gauge of the grip is maintained small to permit its passing between the guide sheaves of the cables.

9 Claims, 25 Drawing Figures

TRANSPORT INSTALLATION WITH TRIPLE GRIP FOR COUPLING THE VEHICLES TO HAULAGE CABLES

The invention relates to a transport installation comprising individual passive vehicles able to move along a track, each vehicle being equipped with a detachable grip for coupling on to a first haulage cable in continuous movement, corresponding to a cruising speed for the vehicles and stretching along the cruising sections of the said track so as to haul in synchronism the successive vehicles coupled on to the cable. A device operates the said grip actuating the coupling and uncoupling respectively of the vehicle at the entrance to and at the exit from a cruising section by the attaching to and detaching from the said haulage cable of the grip. A second haulage cable stretches along auxiliary sections of track and in cable changeover zones parallel with the first cable, the said vehicle being capable of being coupled on to the said second cable.

The U.S. Pat. No. 3,871,303 describes an installation of this type in which a transport vehicle is equipped with several independent coupling grips, each of these being able to work in conjunction with a predetermined cable, respectively for haulage on the line, for deceleration and for acceleration, but the use of independent grips may be the origin of incidents and necessitates safety controls and interlocking systems, the compatibility of which with operating conditions presents difficulty.

The object of the present invention is to remedy these disadvantages and to permit the execution of a reliable high-speed passive vehicle installation, the said vehicles being if necessary of considerable weight.

The installation includes at least two pairs of jaws, one of which is offset in relation to the other transversally to the longitudinal direction of the track, by a distance corresponding to the spacing of the said parallel haulage cables, and each able to work in conjunction with one of the said cables to couple the vehicle on to one of the said cables. The pair of jaws of the said grip are mechanically connected in such manner that one pair of jaws is in the closed coupling position when the other pair is in the open position and inversely, so as to permit a selective coupling of the vehicle on to one or other of the haulage cables.

A change of cable operation, for instance at the entrance to a station is effected by a single control, any false maneuver, in particular that of a simultaneous coupling on to two cables thus being excluded. It is an advantage that the grip has three pairs of jaws, one of which acts in conjunction with the main haulage cable and the two other pairs respectively with an auxiliary deceleration cable and an auxiliary acceleration cable. The main cable stretches in the vertical axial plane of the track and the auxiliary cables are offset laterally on either side of this vertical plane at a distance corresponding with the spacing between the conjugated pairs of jaws.

Another object of the invention is to permit the passing of the grip without the retraction of sheaves and the releasing of the cable as soon as the jaws open.

The three pairs of jaws of the grip are at a same level, and the relative position of the sheaves supporting and maintaining the haulage cables in relation to the track is so determined as to withdraw the cables from the grooves in the sheaves on the passing of a vehicle so as to avoid any contact between the grip and the sheaves. In the uncoupling or cable releasing zones the cable which is raised slightly is extracted automatically by its own weight from the jaws when these open. The gauge of the grip can be kept small in order to permit its passing between the guide or support sheaves without the necessity of retracting some of them for the passing of the vehicle.

The grip with three pairs of jaws allows the taking-over of the vehicle in an intermediagte station by a deceleration cable and after a time of stopping by a cable accelerating the vehicle before it is re-coupled on to the main haulage cable. The cable changeover, in particular on entering and leaving a station, takes place without slowing down of the vehicle, the cable to be gripped being inserted between the open jaws, which close and grip the cable when the grip is actuated. Simultaneously, the cable hauling the vehicle on the line is released and falls outside the open jaws. The cable changeover system also makes it possible to ensure the haulage on special sections of the track, in particular on a switch, or on a change of track section notable at the end of the line.

According to an embodiment of the invention, the grip has two mobile jaws, able to occupy three distinct relative positions, an intermediate opening position of the three jaws, an extreme position in which the intermediate pair of jaws is closed and the two other pairs of jaws are open and an opposite extreme position in which the intermediate pair of jaws is open and the two other pairs are closed.

A kinematic chain, including two torsion bars, connects the jaws with an actuating cam, giving three positions of stable equilibrium corresponding with the above three positions of the jaws, the torsion bars supplying by elastic distortion when in the extreme positions, the clamping pressure of the jaws. A double action hydraulic jack operates the actuating cam.

According to another method of application of the invention the two jaws are connected via kinematic chains with two distinct means of operation. Each means of operation has a sliding rod acting on a knuckle-joint transmitting a clamping force to the said jaws.

The safety in operation, essential for such an installation, is assured by an additional mechanical control of the grip operated from the track, which peremptorily opens the three pairs of grip jaws and frees the vehicles from the haulage cables. An emergency brake then stops the vehicle automatically. The emergency control consists of one or more retractable or non retractable cams arranged along the line which in their active position engage a trigger as the vehicle passes and moves the actuating cam, or the sliding rods into the intermediate position. This trigger also actuates a solenoid valve, reducing to zero the hydraulic pressure on the jack. Oversensitivity of the emergency control is best avoided, as this could be at the origin of untimely tripping.

According to an improvement of the invention, limit detectors signal the position of the sliding cam actuating the grip representing the position of the pairs of jaws, the mechanical liaisons between the cam and the jaws being duplicated. All the signals are transmitted to a processing center which compares them with memorized signals in order to detect any anomaly and set off an alarm or emergency control.

The above and other objects, features and advantages of the present invention will become more readily apparent from the following description, reference being made to the accompanying drawings, in which.

Figure 1:
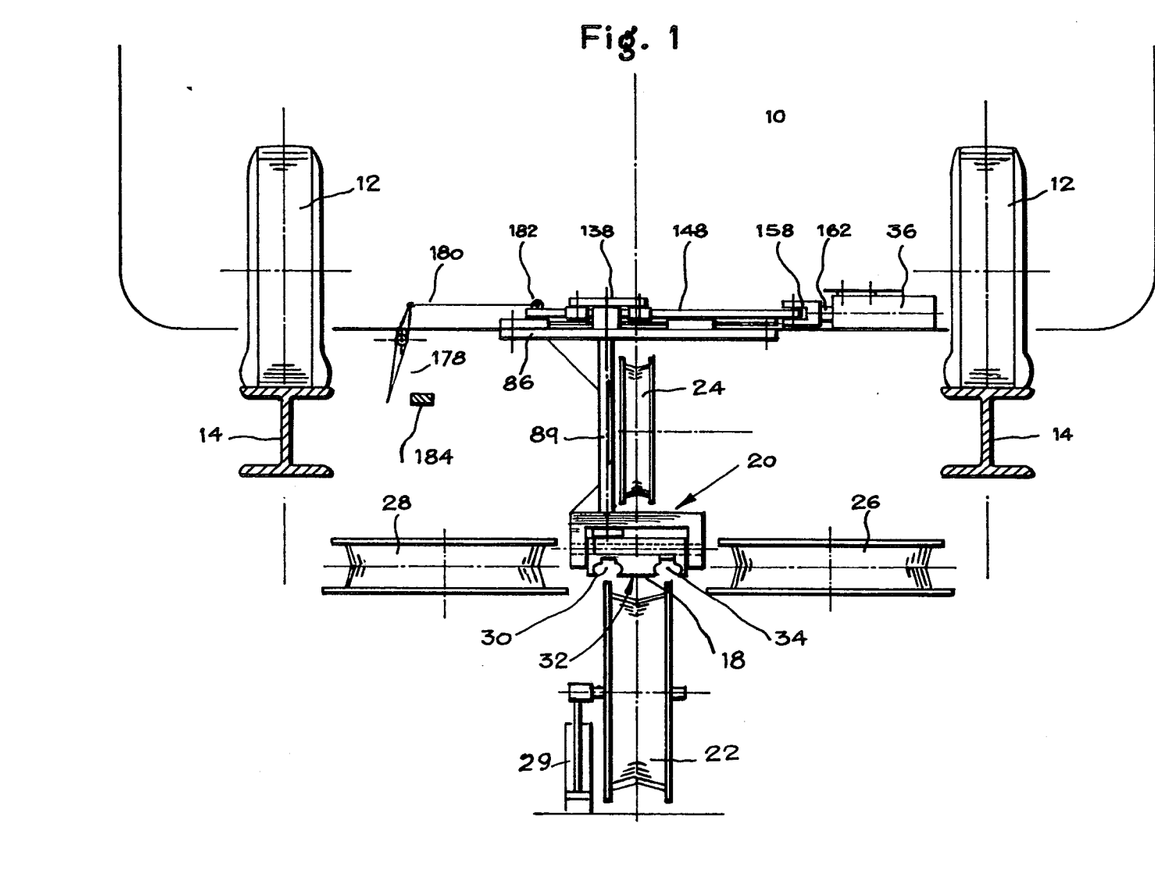
FIG. 1 is a schematic view in transversal cross section of an installaton according to the invention.

In the figures, a passive vehicle or car 10, of which only the lower part is represented in FIG. 1, runs on pneumatic-tired wheels 12 on steel sections 14 forming the rails of a track 16 of a transport system on a guideway, for example of the type described in U.S. patent application No. 240,963, now U.S. Pat. No. 3,812,788. The vehicle 10 is guided by means that, as they are not included in the present invention, are neither shown nor described later. The installation has stations where the vehicles are slowed down and stopped for passengers to board and alight, successive stations being connected by cruising sections, equipped with a haulage cable 18 on to which is coupled car 10 by means of a detachable grip, designated by the general identification 20. A drive station (not shown) drives the main cable 18 continuously at a speed corresponding with the cruising speed of the car 10. Support sheaves 22 and maintaining sheaves 24 as well as lateral sheaves 26, 28 are spaced along the track 16 so as to guide the main cable 18 in the longitudinal axis of the track, a same section being normally equipped with only one sheave. The sheaves 22 to 28 have guide grooves and the relative position of these sheaves in relation to the rails 14 is determined in such manner that the cable 18 gripped by the grip 20 is necessarily withdrawn from the grooves of sheaves 22 to 28 on the passing of vehicle 10. The spacing between sheaves 22 to 28 is adapted to the dimensions of the grip 20 to allow the passing of the grip without displacement or retraction of the sheaves. Following the passing of the vehicle 10, the cable bears once again on the corresponding sheave, for example on the sheave or sheaves 28 when the section includes a bend with the center of the curve to the left of the figure. The sheave 22 may be raised by a hydraulic jack 29.

The grip 20, which will later be described in detail has three pairs of jaws 30, 32, 34, fitted side by side, the central pair of jaws 32 being able to clamp the main cable 18, while the pairs of jaws 30, 34 act in conjunction with auxiliary cables. When the pair of jaws 32 is in the closed position or clamping the cable, the two other pairs of jaws 30, 34 are in the open position and inversely when the pair of jaws 32 is in the open position the pairs of jaws 30, 34 are in the clamping position. The opening and closing of the pairs of jaws 30 to 34 of grip 20 is controlled by a hydraulic jack 36 carried by the vehicle 10.

On referring more particularly to FIGS. 2 to 5, which show an intermediate station of the transport installation, it may be seen that the main haulage cable 18 which stretches in the axis of track 16, is interrupted in the station over the length shown by a dotted line in FIG. 2, this interruption corresponding for example to a deviation of the cable below the track thus putting it outside the range of action of grip 20. The direction of movement at constant speed of the cable 18 is indicated by an arrow in FIG. 2, and the station has at its entrance a zone 38 for the deceleration of the vehicles 10, uncoupled from the main cable 18, followed by a reacceleration zone 40. The deceleration zone 38 is equipped with an auxiliary haulage cable 42 stretched between two end sheaves 44, 46, one of which is a drive sheave, the other providing the tension on cable 42. The cable 42 stretches in parallel with the longitudinal axis of the track, being laterally offset by a distance corresponding with the spacing of the pairs of jaws 30, 32 of the grip 20. In a similar manner, the acceleration zone 40 is equipped with an auxiliary haulage cable 48 passing round end sheaves 50, 52 and offset laterally on the opposite side of the axis of track 16. The deceleration section 38 and the acceleration section 40 overlap in the zone in which the vehicle stops, represented in FIG. 2 by the cross-section IV—IV. The driving of the auxiliary cables 42, 48, for example by electric or hydraulic motors, permit variation of speed in a manner well-known in itself. The deceleration auxiliary cable 42 can be clamped by the pair of jaws 30, while the acceleration auxiliary cable 48 acts in conjunction with the pair of jaws 34.

On the entering of a station by a vehicle 10 hauled by the main cable 18, a changeover of cable takes place in the section III—III. The auxiliary cable 42 is so guided in height as to bring it to the level of the open pair of jaws 30 between which cable 42 is inserted (see FIG. 3a). A track beacon (not shown) transmits a cable changeover order and actuates jack 36 bringing about the opening of the central pair of jaws 32 and the closing of the pairs of jaws 30, 34. The auxiliary cable 42 is clamped by the grip 20 and assures the hauling of vehicle 10. The main cable 18 freed by the opening of the pair of jaws 32 escapes from these (FIG. 3b). A device regulating the driving speed of the auxiliary cable 42 gradually decelerates the vehicle 10 and brings it to a stop in front of the loading and unloading platforms corresponding to secton IV—IV in FIG. 2. A further changeover of cable, illustrated by FIGS. 4a, 4b, 4c, takes place in two stages. The vehicle being stopped while coupled on to the auxiliary cable 42 (FIG. 4a) a flap 54 is raised and inserted between the open pair of jaws 32. An order actuating grip 20 brings about the closing of the pair of jaws 32, which clamp flap 54, and the freeing of the auxiliary cable 42 by the opening of the pair of jaws 30. The guiding in height of the auxiliary cable 42 is carried out in such manner as to allow the falling of the auxiliary cable 42 outside the open pair of jaws 30. (FIG. 4b). The vehicle 10 is immobilized by the flap 54 during the boarding and alighting of passengers. During this period the deceleration cable 42 may again be accelerated to take over the following vehicle and the acceleration cable can be braked and stopped to take over the stopped vehicle (FIG. 4c). For this, the cable 48 is raised and inserted between the open pair of jaws 34 and a new order for the actuating of the grip involves the freeing of the flap 54 and the clamping of the acceleration cable 48. The auxiliary cable 48 is set into movement and accelerated to bring the vehicle 10 to the exit from the station at a speed equal to that of the main cable 18 which is guided in height so that it is inserted between the open pair of jaws 32 in section V—V in which takes place a new changeover of cable commanded by a beacon not represented (FIG. 5a). The actuating of the grip brings about the freeing of the acceleration cable 48 which falls and the clamping of the main cable 18 (FIG. 5b). The maneuver has been described for a single vehicle hauling grip, but it is clear that the vehicle can be equipped with two grips fitted one behind the other in the longitudinal axis of the vehicle, the controls being of course identical.

Figures 2, 6:
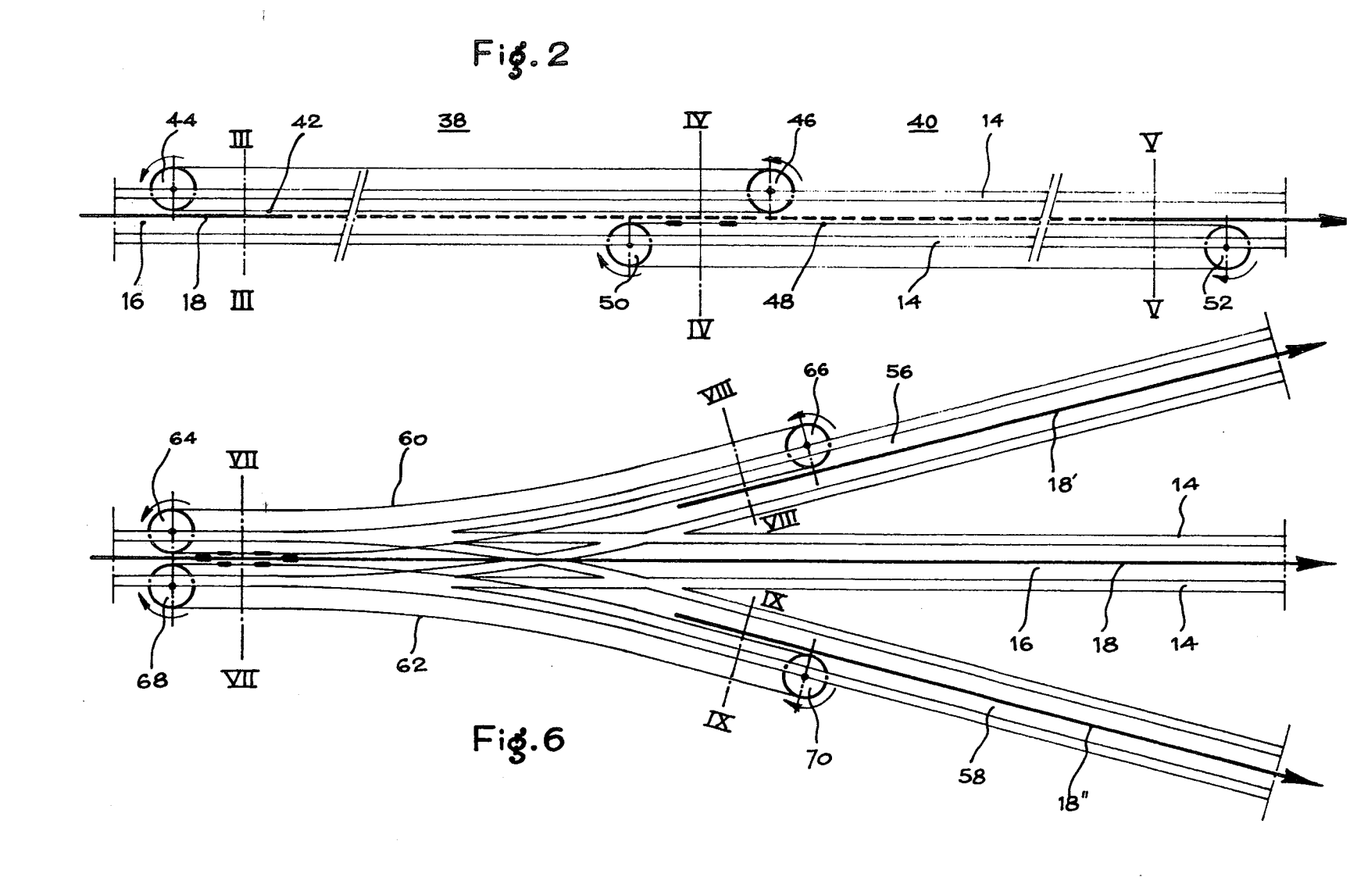
FIG. 2 is a schematic view in plan of the haulage cable system in a station of the installation.
FIG. 6 is a view analogous to that of FIG. 2, of a double junction of the installation.
Figures 3, 4, 5, 7, 8, 9:
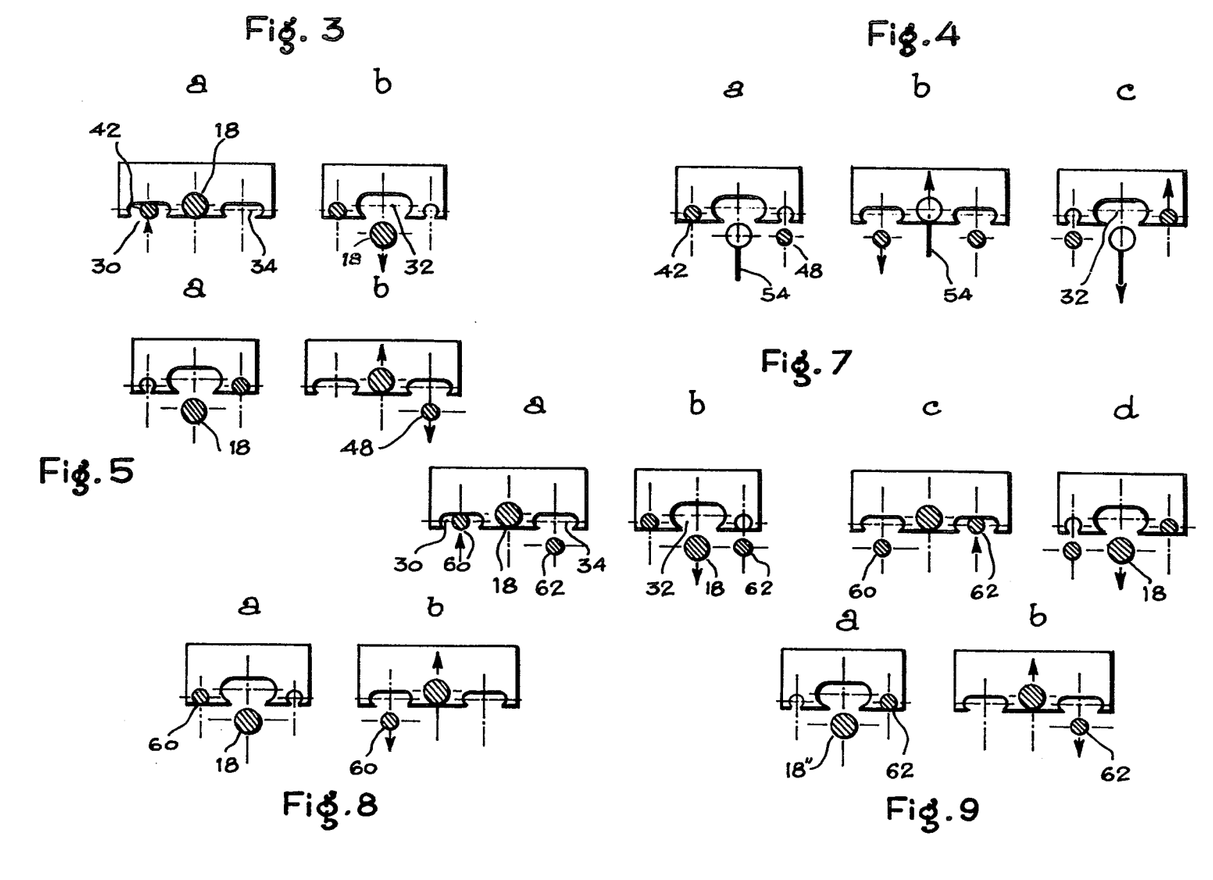
FIG. 3 shows a cross section along the line III—III in FIG. 2 respectively at a and b the positions of the grip and cables when a changeover of cable is made.
FIG. 4 is a view analogous to that of FIG. 3, showing at a, b and c the respective positions of the grip and the cables in the cross-section along the line IV—IV in FIG. 2.
FIG. 5 is a view analogous to that of FIG. 3, in the cross-section along the line V—V in FIG. 2.
FIGS. 7, 8 and 9 are views analogous with those of FIGS. 3 to 5, respectively, along the lines VII—VII, VIII—VIII and IX—IX of FIG. 6.

FIG. 6 represents a double junction of the transport installation in which may be recognized the main track 16 in a straight line equipped with the main haulage cable 18. A branch track 56 to the left and a branch track 58 to the right of the junction are each equipped on leaving the junction with a main haulage cable 18', 18" stretching in the axis of the tracks. The main cables 18', 18" pass round driven end sheaves (not shown) installed at the exit from the junction. Each branch track 56, 58 is equipped in the switch area with an auxiliary haulage device comprising an endless cable 60, 62 running round end sheaves 64, 66; 68, 70 installed respectively at the entrance to and exit from the junction, overlapping the ends of main cables 18', 18". When the main cables 18, 18', 18" are driven at the same speed, the auxiliary cables 60, 62 are driven at the same speed as the main cables 18, 18', 18". Should the speeds of main cables 18', 18" be different from the speed of cable 18, the speed of cables 60 and 62 is variable, so as to be equal to that of cable 18 in the coupling position at VII—VII and equal to that of the cables 18', 18" in the uncoupling positions at VIII—VIII and IX—IX. The auxiliary cable 60 is offset laterally to the left in relation to the main cable 18 and cable 62 to the right, by a distance corresponding with the spacing of the pairs of jaws of grip 20.

On referring more particularly to FIGS. 7 to 9, it may be seen that a vehicle 10, driven on the main track 16 by cable 18, and continuing its travel on this main track passes through the junction without any change of cable, remaining permanently coupled on to main cable 18. A vehicle 10 switched over to branch track 56 by the guide system (not shown) is uncoupled from the main cable 18 by actuation of the grip 20 in section VII—VII of FIG. 6. FIG. 7a shows the respective positions of the cables 18, 60, 62 and of the jaws 30, 32, 34 of a vehicle at the entrance to the junction, and it is seen that cable 60 has been raised by the hydraulic jack 20 so as to be inserted between the open pair of jaws 30. The cable 62, associated with the branch track 58 not selected remains in the lowered position outside the pair of jaws 34. In section VII—VII after the actuating of the grip 20, the pair of jaws 30 clamps the cable 60, the main cable 18 freed by the opening of the pair of jaws 32 having fallen (FIG. 7b). The vehicle hauled by the auxiliary cable 60 follows the branch track 56 to reach the exit from the junction at section VIII—VIII of FIG. 6, where a new changeover of cable takes place, in a manner that will be described later. In the case of a diversion onto the branch track 58, the auxiliary cable 60 is maintained in the lowered position while the auxiliary cable 62 is raised so as to be inserted between the pair of jaws 34 (see FIG. 7c). The actuating of the grip in section VII—VII couples the vehicle 10 on to the cable 62 while freeing the main cable 18 (FIG. 7d). The vehicle 10 is thus hauled by the cable 62 on to the branch track 58. FIG. 8 shows the changeover of the grip at section VIII—VIII and FIG. 9 at section IX—IX for the coupling of the vehicles on to the main cables 18', 18". The main cables 18', 18" are guided in such manner as to be inserted between the open jaws 32 and on the actuating of the grip the vehicle is coupled on to cable 18', 18", the auxiliary cable 60, 62 being released by the opening of the corresponding pairs of jaws 30, 34. It is unnecessary to describe in greater detail these cable changeover devices which are analogous to those previously described when referring to FIG. 2.

Figure 10:
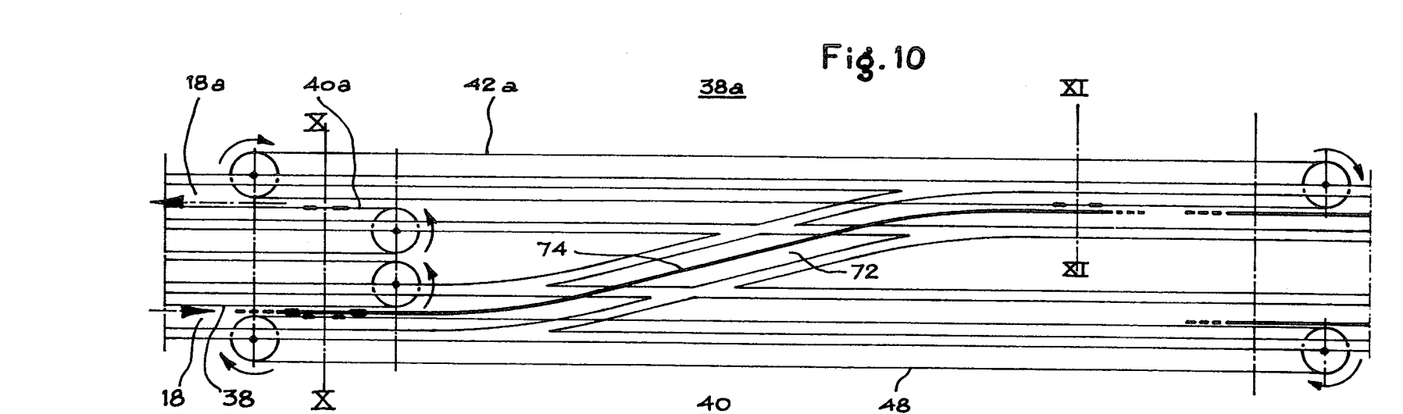
FIG. 10, analogous to FIG. 6, illustrates a change of track switch of the installation.
Figure 11:
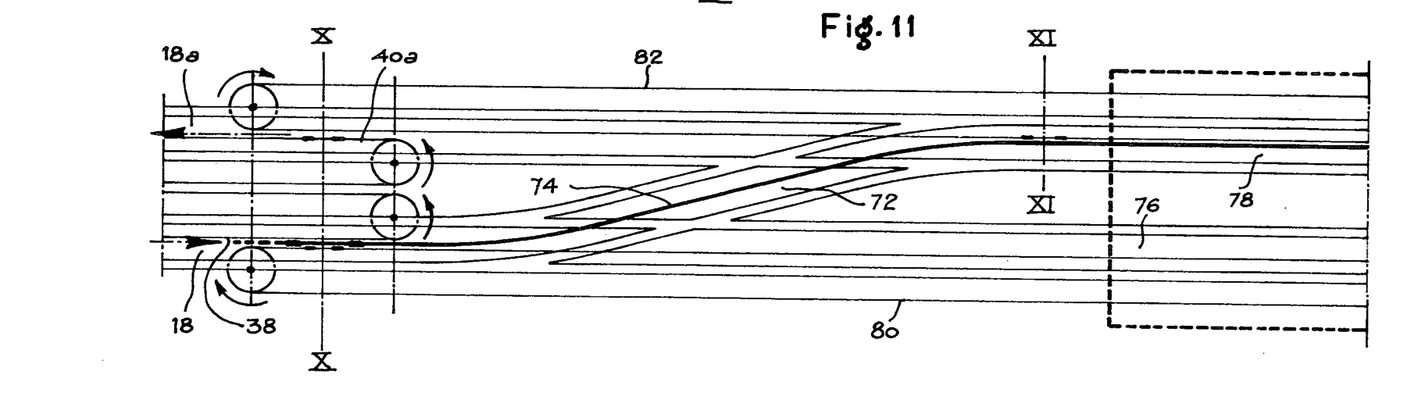
FIG. 11, analogous to FIG. 10, illustrates an end station of the installation.
Figure 12:
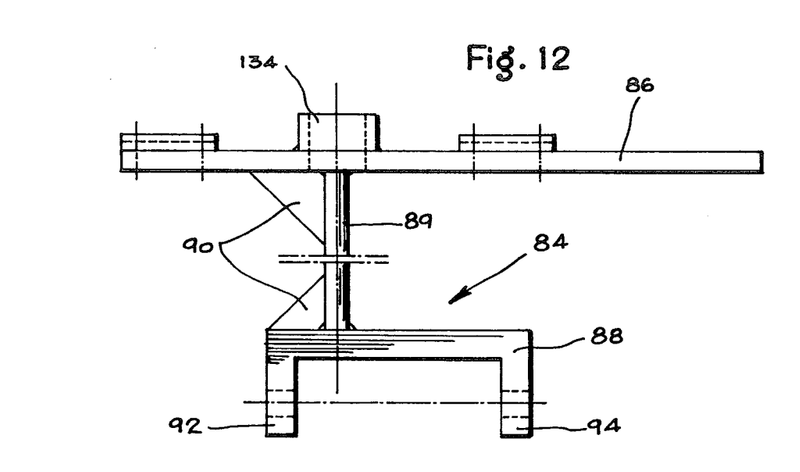
FIG. 12 is a partial view on an enlarged scale of FIG. 1, showing the frame of the grip.
Figure 13:
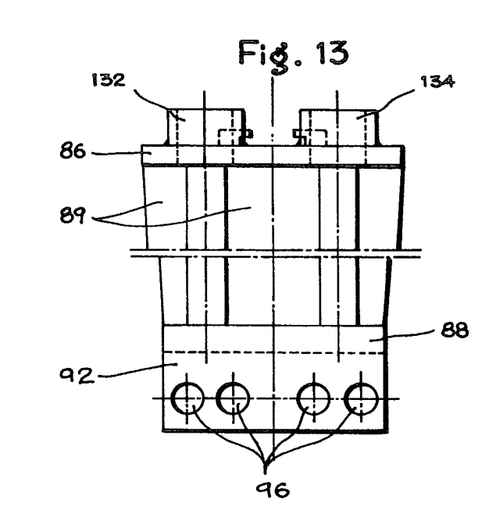
FIGS. 13 and 14 are respectively views from the left and in plan of the frame in accordance with FIG. 12.
Figure 14:
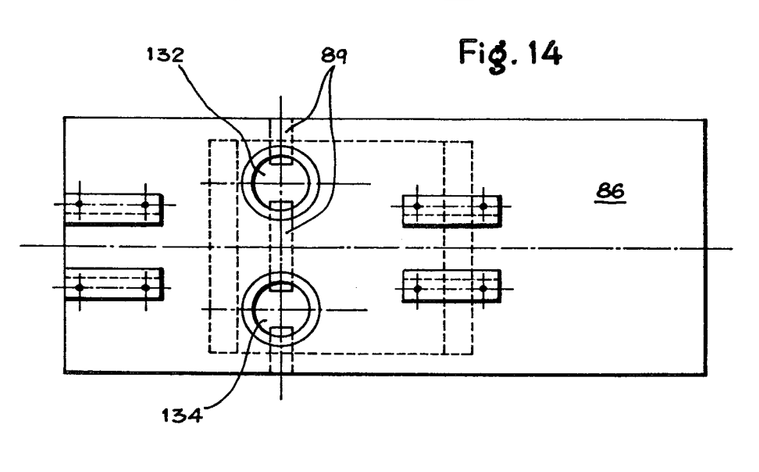

FIGS. 10 and 11 illustrate as examples two other layouts of tracks and haulage cables of an installation according to the invention, with two tracks for vehicles, one for the outward journey and one for the return. In the staion shown in FIG. 10, functioning normally as an intermediate station in accordance with FIG. 2, the vehicles may change track to transform this intermediate station into a terminal station, notably in case of an incident downstream from the station. Such a device enables a partial operation of the system, in the manner described above. The stopping zone for the vehicles is identified by section X—X in FIG. 10 and in which may be seen the acceleration section 40 of the outward track 18 and opposite the deceleration section 38a of the return track 18a parallel to track 18. Sections 40 and 38a are respectively equipped with an accelerator cable 48 and a decelerator cable 42a, in the manner described on referring to FIG. 2. The tracks 18, 18a are connected by a branch 72 equipped with a main haulage cable 74, stretching in the axis of the branch track 72 and overlapping auxiliary cable 48, 42a respectively in the sections X—X and XI—XI identified in the FIG. 10.

During normal working, the vehicles circulating on the outward track 18 are decelerated by the auxiliary cable 38 and come to a stop in section X—X before being re-accelerated by the auxiliary cable 48 in the manner described above. The vehicles circulating on the return track 18a are decelerated by the cable 42a and stop in section X—X before being reaccelerated by the cable 40a. In case of incidents downstream of the station on the right hand side of FIG. 10, the vehicles on the outward track 18 stop in the loading zone X—X. The change of track is effected on the one hand by an appropriate actuation of the guide devices (not shown) and on the other hand by the actuating of the haulage cable. The acceleration cable 48 is maintained in the lowered position while the main cable 74 of the branch track is raised to insert it between the pair of jaws 32. On the actuating of the grip in section X—X, the vehicle is coupled on to the main cable 74, which hauls the vehicle to section XI—XI where there is another stop so as to release cable 74 and to couple on to the auxiliary cable 42a which hauls the vehicle to the stopping section X—X, in view of normal circulation on the return track 18a. The cables 74, 42a must of course be driven at variable speeds corresponding to those of the vehicles.

FIG. 11 shows a terminal station with a branch track 72 equipped with a main cable 72 enabling a change of track of the vehicles, as described above. The vehicles arriving on the main track 18 stop in secton X—X and during normal working are diverted on to branch 72 by being hauled by the cable 74. Tracks 18, 18a are extended by siding tracks 76, 78 each of which is equipped with an auxiliary haulage cable 80, 82, enabling the transfer of vehicles from section X—X to the siding zones formed by tracks 76, 78 and inversely. The working of this station follows from the previous statement, and it is sufficient to observe that the track 78 allows a reserve of vehicles that can be put into service on the system in case of need.

It is evident from the examples of the various elements of the installation described that the grip is an essential element of the invention, a method of execution of which is shown in FIGS. 12 to 23.

Figure 15:
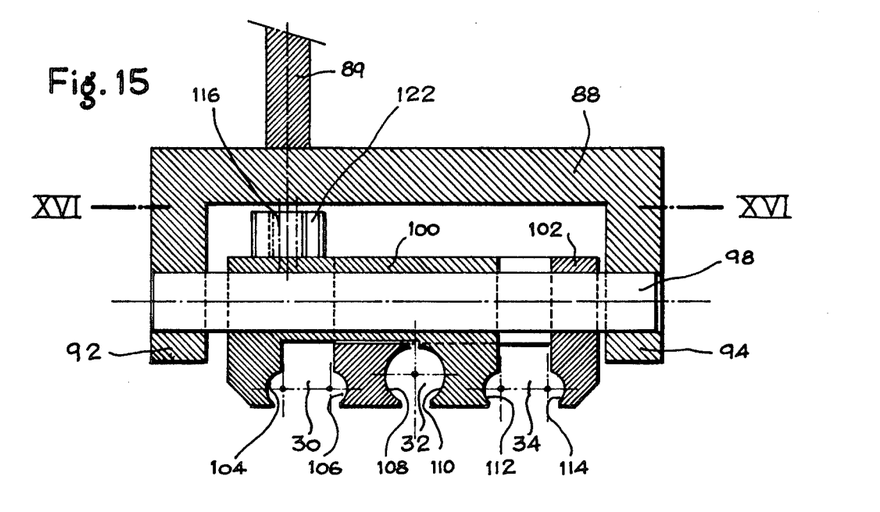
FIG. 15 is a partial view on an enlarged scale of FIG. 1, illustrating in cross-section along the line XV—XV of FIG. 16 the jaws of the grip.
Figure 16:
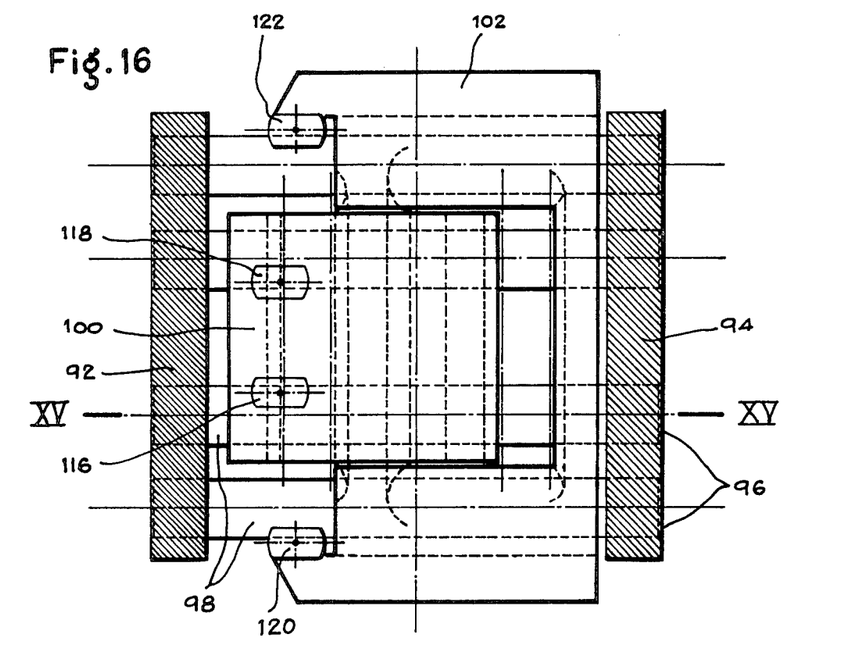
FIG. 16 is a cross-section along line XVI—XVI of FIG. 15.

The frame or chassis 84 of the grip 20 (see FIGS. 12 to 14) is constituted by two parts, in the occurrence a platen 86 for fixing to the frame or to the bottom of the vehicle 10 by any appropriate means, and a stirrup-piece in channel on which are fixed the pairs of jaws of the grip. The stirrup-piece 88 is fixed to the platen 86 by means of three plates 89 reinforced with the gussets 90. The plates 89 extend in a vertical plane, offset in relation to the vertical plane passing through the axis of the track, in such manner as to allow a free passage past the maintaining sheaves 24 (see FIG. 1). The plates 89 bridge the space between the bottom of the vehicle 10 and the level of the haulage cables located below the running rails 14. The parallel vertical flanges 92, 94 of stirrup 88 are each drilled with four holes 96 in which are inserted guide-rods 98 (see FIGS. 15 and 16) extending in parallel in a transverse direction in relation to the track. Two cheeks 100, 102 are mounted so as to slide on the rods 98, the cheek 100 rectangular in shape fitting into cheek 102 in the form of a U. Each pair of jaws 30, 32, 34 consists of a left-hand jaw and a right-hand jaw in the form of a half-groove identified respectively as 104, 106 for pair 30; 108, 110 for pair 32; and 112, 114 for pair of jaws 34. Jaws 104, 110 and 112 are integral with cheek 100, while jaws 106, 108 and 114 are carried by the cheek 102. When the cheeks 100, 102 are in the separated position, as shown in FIGS. 15 and 16, the pair of jaws 32 is closed and the pairs of jaws 30, 34 are open. The approaching of cheeks 100, 102 results in the opening of the pair of jaws 32 and the closing of the pairs of jaws 30, 34.

Figure 17:
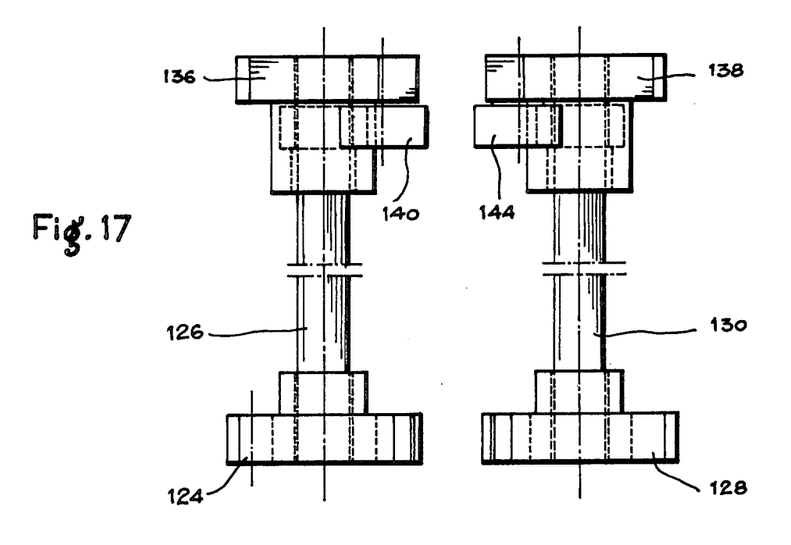
FIG. 17 is a view in elevation of the torsion bar control rods of the grip illustrated in FIG. 1.
Figure 18:
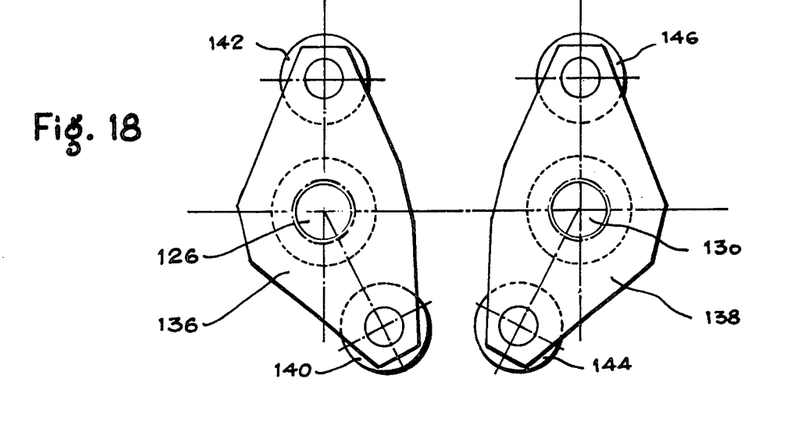
FIGS. 18 and 19 are respectively views of FIG. 17 from above and below.
Figure 19:
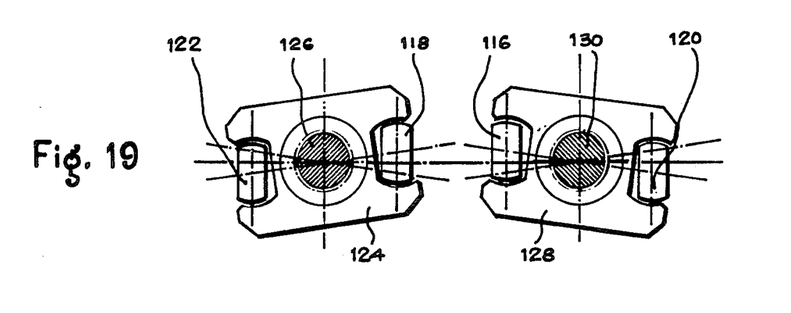

Each cheek 100, 102 has on top two lugs 116, 118 and 120, 122. The pair of lugs 118, 122 mesh with a tumbler 124 keyed on to the end of a torsion bar 126. The pair of lugs 116, 120 mesh in a similar manner with a tumbler 128 keyed on to the end of a torsion bar 130 (FIGS. 17 to 19). The torsion bars 126, 130 are mounted so as to rotate on platen 86 by means of journals 132, 134 (FIGS. 12 to 14) and their upper ends, protruding from the journals 132, 134 carry plates 136, 138 mounted on splines. It is easily seen that a symmetrical rotation of plates 136, 138 is transmitted by the torsion bars 126, 130 to tumblers 124, 128 which move cheeks 100, 102 in line, in opposite directions. A continued rotation of the plates 136, 138, after the cheeks 100, 102 have reached the clamping position engenders an elastic distortion of torsion bars 126, 130 and a clamping pressure on the closed pairs of jaws. An inverse rotation of the plates 136, 138 results in the unclamping and then the movement in opposite direction of the cheeks 100, 102.

Figure 20:
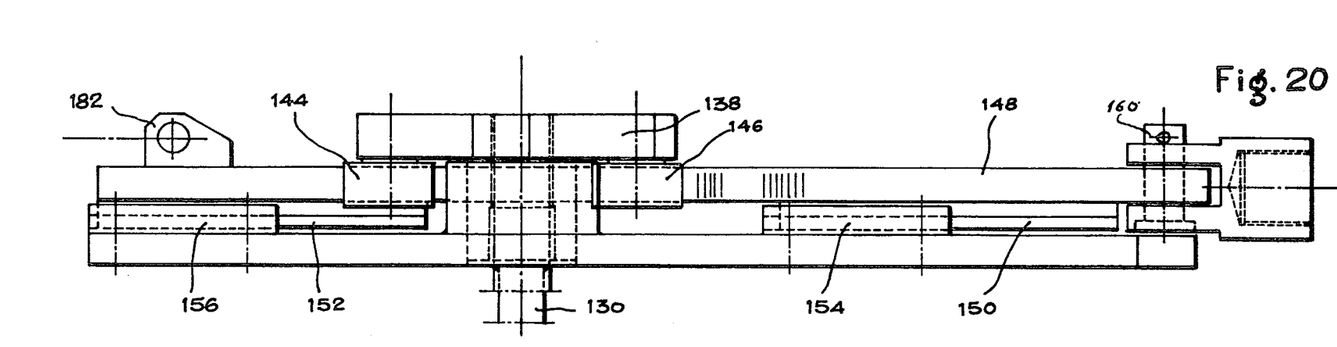
FIG. 20 is a partial view on an enlarged scale of FIG. 1, showing the cam actuating the grip.
Figure 21:
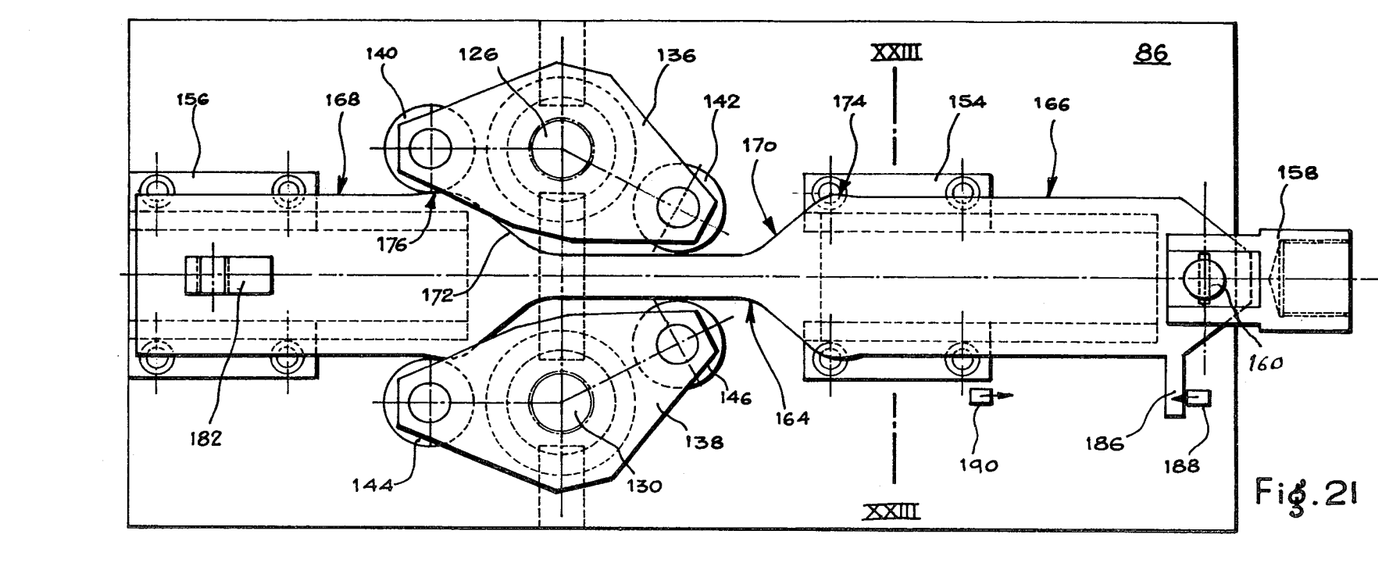
FIG. 21 is a view in plan of FIG. 20.

Each of the plates 136, 138 is fitted with two wheels, respectively 140, 142, 144, 146, able to work in conjunction with a sliding cam 148 (FIGS. 20, 21). The guiding of the sliding cam 148 is effected by means of male slides 150, 152 fixed to the lower part of cam 148 and acting in conjunction with female slides 154, 156 fixed to platen 86 (see FIG. 23). A yoke 158 hinged by means of a spindle 160 on cam 148 connects the latter to the rod 162 of the double acting hydraulic jack 36 (FIG. 1). The sliding in one direction or the other of cam 148 is actuated by the supply to the hydraulic jack 36.

The profile of cam 148 has in the central part a narrow section 164, which is connected at each end with enlarged parts 166, 168, by means of ramps 170, 172. The cam 148 has bosses 174, 176, the use of which will appear later. The cam 148 is inserted between plates 136, 138 in such manner as to work in conjunction with the wheels 140 to 146, the profile of the cam and the set-up being entirely symmetrical. In the extreme right-hand position of the cam 148, shown in FIG. 21, wheel 140 has crossed boss 176 and acts in conjunction with the enlarged part 168, while wheel 142 is at the level of the narrow section 164. The plate 136 is thus pivoted to its extreme position in the clockwise direction. In this position, the torsion bar 126 is subjected to tension and it will be understood that the wheel 140 is applied against the enlarged part 168 or boss 176 and exerts a locking force. In a symmetrical manner the plate 138, the wheel 144 of which acts in conjunction with the enlarged part 168 and wheel 146 with the narrow section 164 is pivoted to its extreme position in the counter-clockwise direction.

Figure 22:
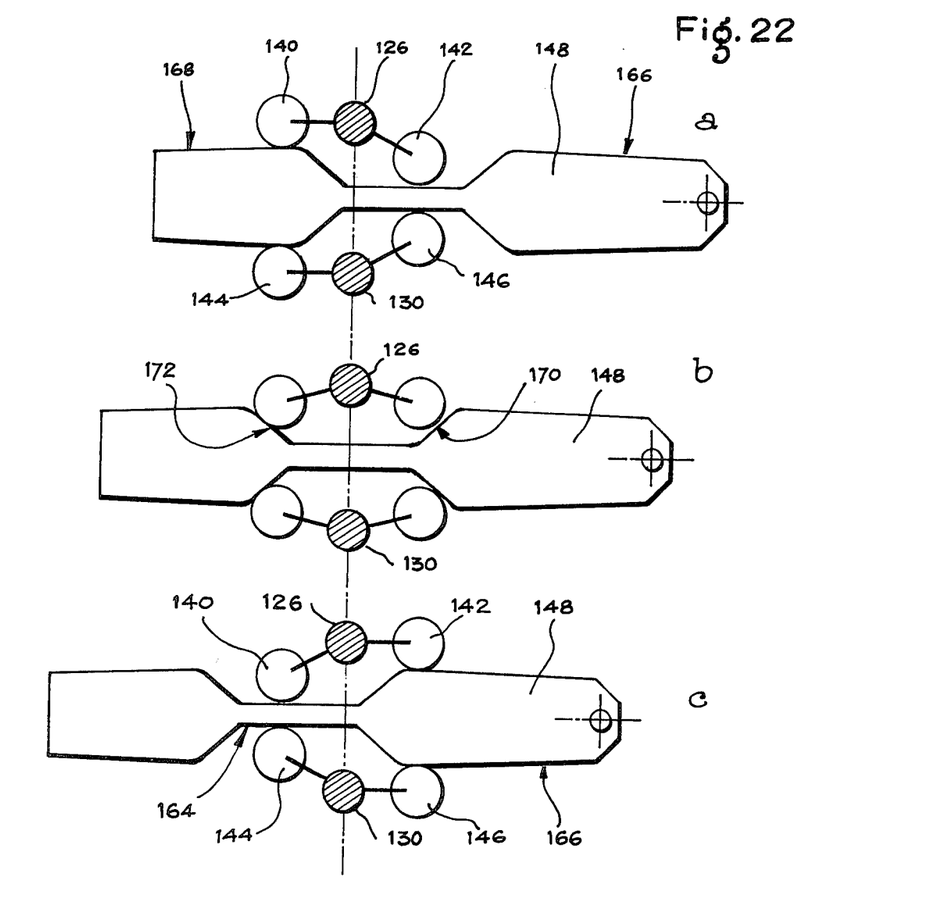
FIG. 22 represents respectively at a, b and c the three stable positions of the actuating cam according to FIG. 21, the profile of the cam corresponding with an alternative execution.
Figure 23:
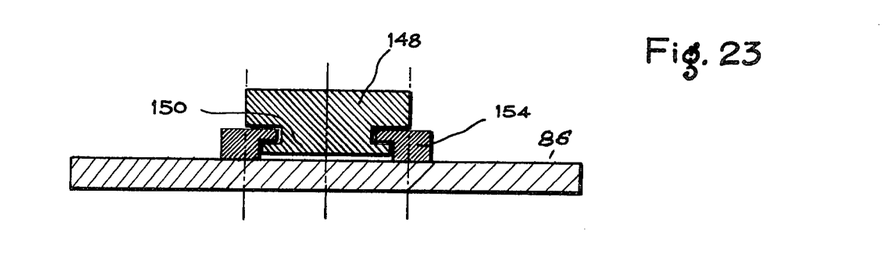
FIG. 23 is a cross-section along the line XXIII—XXIII of FIG. 21.

On referring more particularly to FIGS. 22a, 22b, 22c, it may be seen that the movement to the left of cam 148 from the position shown in FIG. 22a, which corresponds to that of FIG. 21, brings the cam into the intermediate position (22b) in which the two wheels are in the narrow section and finally in the opposite extreme position where the wheels 142, 146 act in conjunction with the enlarged part 166 and the wheels 140, 144 with the narrow section. The movement of translation of the cam 148 to the left results in a symmetrical pivoting of torsion bars 126, 130 in the opposite direction. An inverse movement of the sliding cam 148 from position c to position a engenders of course an inverse pivoting of the torsion bars 126, 130. The extreme positions a and c correspond to the end of travel positions of the hydraulic jack 36 and in these extreme positions the cam 148 is mechanically locked by the bosses 174, 176. The locking is not necessarily done by the bosses, but it may result from a cam profile, shown in FIG. 22 which presents a counterslope in the enlarged parts 166, 168. The action of the wheels applied under pressure by the elastic distortion of the torsion bars 126, 130 on the counterslopes, exert a stress on cam 148 in the extreme position, assuring a locking.

The grip according to the invention functions in the following manner:

In the position shown by the figures, of the coupling of the vehicle 10 on to the main cable 18, the cheeks 100, 102 are in the separated position in which the pair 32 of jaws 108, 110 are clamped together. The cam is in the right-hand position (FIG. 22a), the torsion bars being pivoted to their maximum position in the clockwise direction for bar 126 and in the opposite direction for the bar 130. On the arrival of the vehicle in a cable changeover zone, a beacon installed on the track emits and transmits to an order for the actuating of the grip 20. This order results in the supply of power to the hydraulic jack which moves the cam 148 to the left after passing over the locking bosses 174, 176. The movement of the cam 148 involves the swinging of the plates 136, 138 fixed on the torsion bars 126, 130, which transmit their rotation to the tumblers 124, 128 which in their turn bring about the linear movement of the lugs 116 to 122, and thus moving the cheeks 100, 102 by approaching one to the other. This movement results in the separation of the jaws, 108, 110 which frees the main cable 18 and the approaching of the jaws 104, 106 and 112, 114, thus clamping an auxiliary cable inserted between one of these pairs of jaws 30 or 34. An opposite actuation of the jack 36 obviously brings the sliding cam 148 into the original position illustrated by FIG. 22a, and the opening of the pairs of jaws 30, 34 and the closing of pair 32.

In the extreme positions, the torsion bars 126, 130 are under elastic tension assuring the clamping pressure of the pairs of jaws, the profiles of which are of course appropriate to the diameters of the cables to be clamped. In the example illustrated by the figures, the median pair of jaws 32 acts in conjunction with a cable of larger diameter than that of the cables acting in conjunction with the jaws 30, 34. In the intermediate position illustrated by FIG. 22b, the torsion bars are slackened and the cheek 100, 102 are in an intermediate position corresponding with the opening of the three pairs of jaws 30, 32, 34. The double-acting jack 36 is unable to actuate this intermediate position which corresponds with a safety position to be described later.

To palliate any failure in the actuating of the grip or to allow an emergency actuation, the grip is equipped with a mechanical control for opening the three pairs of jaws. The vehicle 10 is fitted with a trigger 178 (FIG. 1) mounted so as to pivot on the frame and mechanically connected by a rod 180 to a gusset 182 fixed on cam 148. The trigger 178 can work in conjunction with cams, one of which 184 is shown schematically in FIG. 1. The cams are installed along the track, in particular in the cable changeover sections and adjusted to verify the position of cam 148. Should the cam 148 not be moved by the hydraulic jack 36, the cams 184 engage, on the passing of the vehicle, the trigger 178 and move it to the median position which forces the sliding of the cam 148 and the passing over the locking bosses 174, 176. To allow this movement the jack 36 must necessarily be out of action and for this purpose the trigger 178 can for example operate a valve (not shown) discharging the jack 36. The sliding cam 148 is thus brought into the intermediate position, shown in FIG. 22b, corresponding with the opening of the three pairs of jaws 30, 32, 34 and the vehicle is uncoupled from the three cables. A safety brake comes into action.

Another safety verifies that following a cable changeover the new cable is securely held by the grip. For this purpose the sliding cam 148 has a control trigger 186 actuating limit switches 188, 190 (FIG. 21). The closing of the limit switch 188 confirms the closing of the pair of jaws 32, whereas the closing of switch 190 indicates the closing of the pairs of jaws 30, 34.

The detector of the position of the grip 20 is advantageously combined with a detector of the presence of the cables at the level of the pairs of jaws 30 to 34. Such a detector can for example be devised for example by means of feelers fixed to the bottom of the vehicle, one feeler (not shown) being associated with each pair of grips 30, 32, 34 in such manner as to be engaged by a cable held by the corresponding jaw. The on or off signals emitted by the feelers detecting the presence of the cables and the position detectors 188, 190 of the position of the grip 20, are transmitted to a fixed processing installation and can be compared with posted signals permitting the detection of any anomaly and the emitting of an alarm signal. The processing of logic signals is simple and can be with intrinsic safety.

Figure 24:
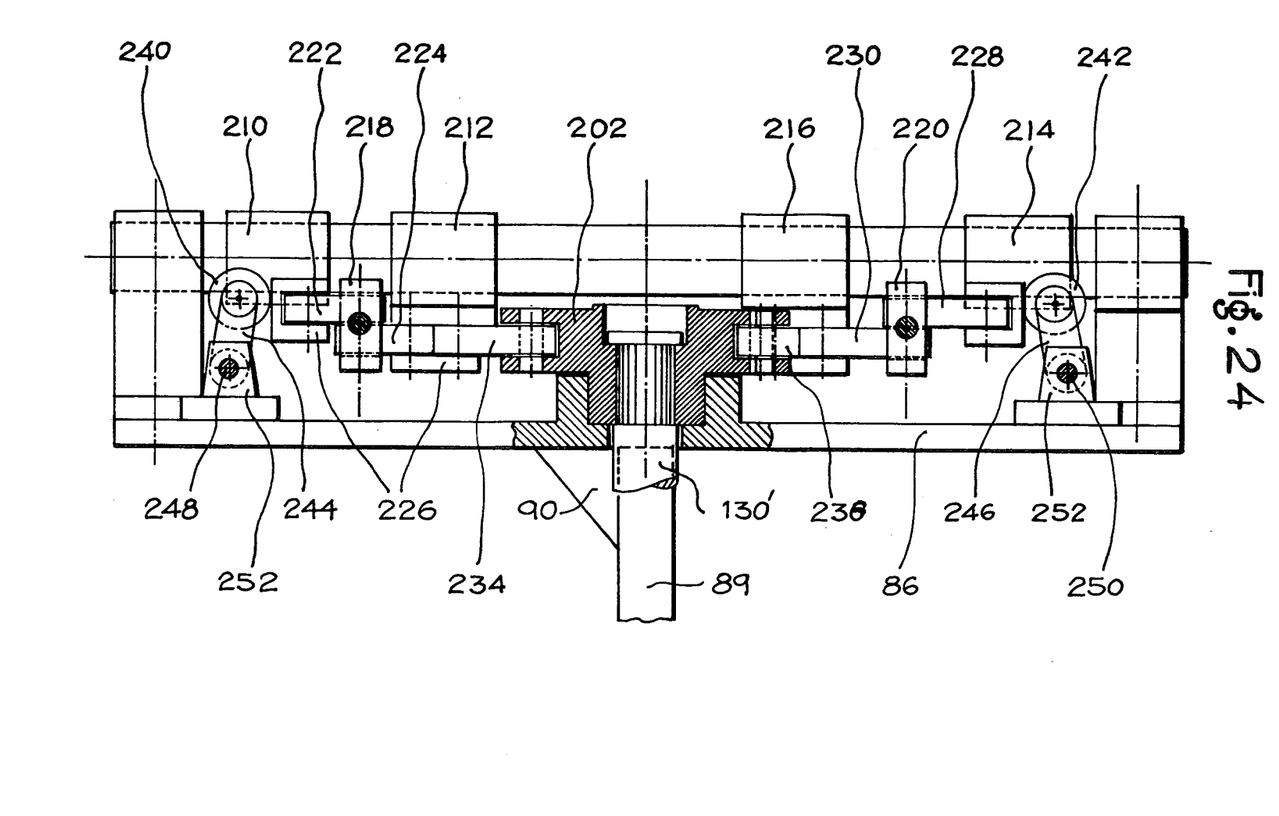
FIGS. 24 and 25 are views analogous to those of FIGS. 20 and 21, illustrating an alternative execution.
Figure 25:
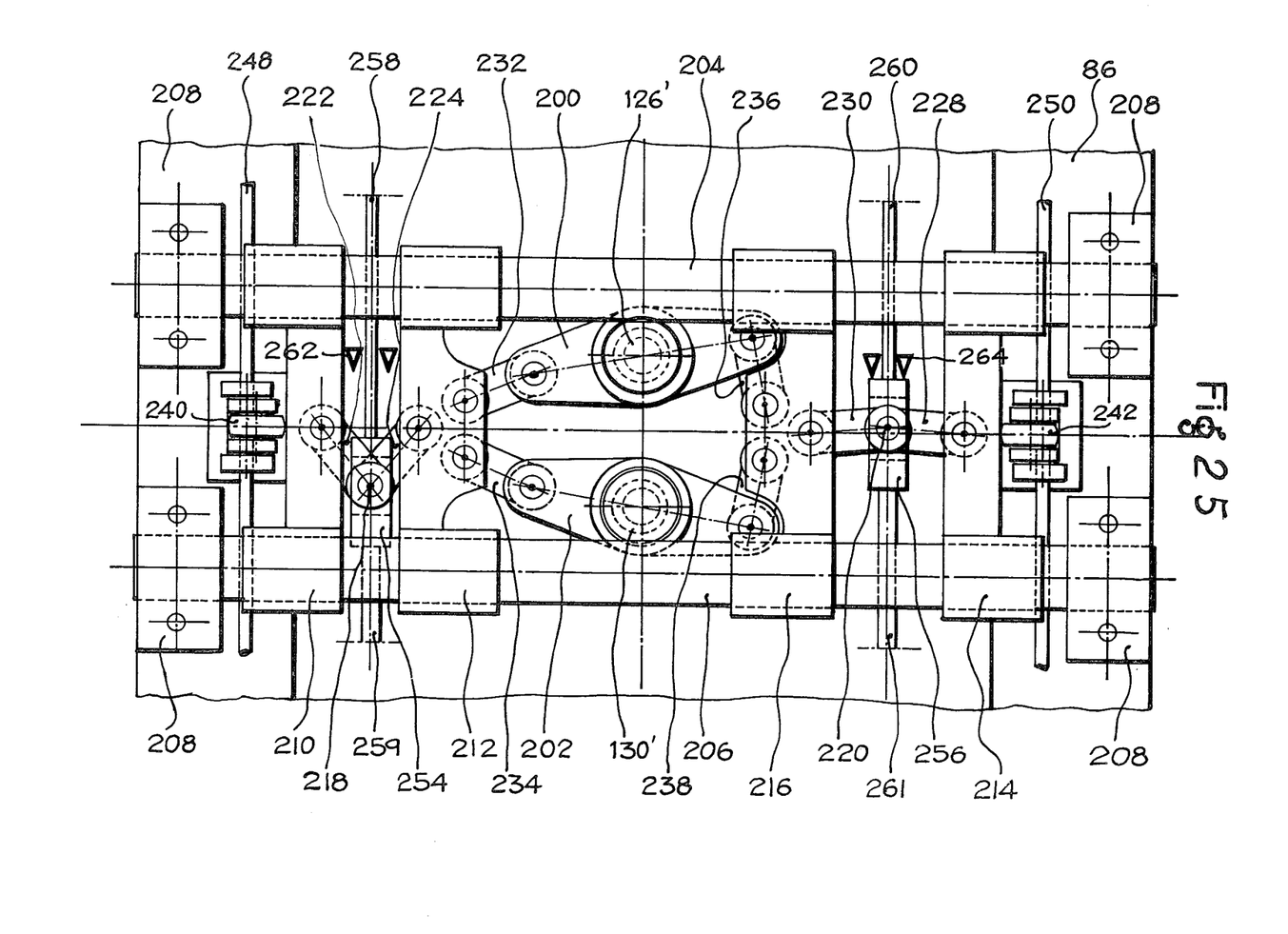

FIGS. 24 and 25 illustrate an alternative execution of the grip, in which the rotating bars 126', 130', analogous with the bars 126, 130, are, contrary to the latter, rigid so as to transmit the rotary movement to tumblers 124, 128, without notable distortion. The rockers 200, 202 are fixed on the splined ends of bars 126', 130'. Two parallel tubes 204, 206 are fastened by supports 208 to platen 86 and on these tubes 204, 206 are mounted so as to slide two pairs of sliders 210, 212 and 214, 216. A knuckle-joint, with spindle 218 connects these sliders 210, 212, levers 222, 224 of the knuckle-joint being articulated in the first place on spindle 218 and in the second in the yokes 226 of the sliders 210, 212. In a symmetrical manner a knuckle-joint with spindle 220 and levers 228, 230 connects sliders 214, 216. The rockers 200, 202 are connected on one side by a pair of rods 232, 234 to slider 212 and symmetrically on the other side by rods 236, 238 to slider 216 in such manner as to form a crank mechanism, transforming a sliding movement of the sliders 212, 216 into a rotary movement of the rockers 200, 202 and of the bars 126', 130' associated with these. It may easily be seen that the sliding to the right in FIG. 25 of the slider 212 results in the rotation of the bar 126' in the clockwise direction and an inverse rotation of the bar 130', these rotations implying the sliding to the right of slider 216.

The sliders 210, 214 on their sides opposite to knuckle-joints 218, 220, act in conjunction with elastic buffers formed by wheels 240, 242, both mounted loose in a fork 244, 246, the base of which is fixed to a torsion bar 248, 250, supported by pillow-blocks 252 and biasing the wheels 240, 242 on contact with the sliders 210, 214. The spindles of the knuckle-joints 218, 220 are mounted in forms 254, 256 fixed to sliding control rods 258, 259, 260, 261, which extend perpendicularly to the tubes 204, 206. Buffers 262, 264 represented schematically by arrows limit the moving of yokes 254, 256 towards the top in FIG. 25, in the extended position of knuckle-joints 218, 220 when the dead center is passed. In this position of extension of the knuckle-joint, shown on the right hand side of FIG. 25, the sliders 214, 216 are maintained in a position of maximum separation, by the knuckle-joint 220 arched against buffer 264.

The actuating device operates in the following manner:

The position represented in the figures corresponds with the clamping of the auxiliary pairs of jaws, the central pair being open. The actuating elements, shown on the right-hand part of FIG. 25, and allocated to the auxiliary pairs of jaws are in the active position of extension of the knuckle-joint, whereas the elements on the left are inactive, the knuckle-joint 218 being collapsed. The elastic force of torsion bar 250 is transmitted by wheel 242, slider 214, knuckle-joint 220, slider 216 and the rods 236, 238 to the rockers 200, 202, which exert a pressure on the cheeks in the position in which the auxiliary jaws are clamped. The torsion bar 250 thus furnish the clamping pressure for the jaws and it will be understood that wear on the jaws will necessitate an increased movement of slider 216 in the direction of rockers 200, 202. The corresponding release of torsion bar 250 and the decrease in the force furnished by bar 250 is compensated by the transmission with rods 236, 238 and rockers 200, 202, forming cranks, so as to maintain appreciably the clamping force of the jaws.

The actuating elements, shown in the left-hand part of FIG. 25, are in the released position, the knuckle-joint collapsed, interrupting the liaison between torsion bar 248, which is released, and rockers 200, 202.

The opening of the auxiliary pairs of jaws is actuated by an impulse exerted on the control rod 260, towards the bottom of FIG. 25, to collapse knuckle-joint 220. Such a movement of control rod 260 implies the previous releasing of pressure in the control jack (not shown) mounted at the end of control rod 259, 261 or of any other system of control of the rod. The two knuckle-joints 218, 220 being collapsed, the actuating elements for reasons of symmetry, are in a position of equilibrium corresponding to the opening of all the pairs of jaws.

The re-closing of the auxiliary pairs of jaws results of course from the sliding in the opposite direction of the control rod 260, bringing the knuckle-joint 220 into the extended locked position shown in FIG. 25.

The closing of the central pair of jaws, from the above mentioned position of equilibrium results from the sliding of the control rods 258, 259 towards the top in FIG. 25, for example under the action of a jack, mounted on the end of control rod 259, 261, resulting in the extension of the knuckle-joint, with the passing of the top dead center and contact with buffer 262.

The movement of separation of the sliders 210, 212 results in the pivoting of the rockers 200, 202, with the gradual putting under tension of torsion bar 248, so as to close and clamp the pair of central jaws. The movement of the rockers 200, 202 is accompanied by the approaching of the sliders 214, 216 and a movement downwards of the control rods 260, 261 and yoke 256.

The operation is entirely symmetrical, one of the control rods and its associated elements actuating the central pair of jaws and the other control rod actuating the pairs of auxiliary jaws. The clamping forces may however be varied by a suitable choice of characteristics of torsion bars 248, 250.

The movement of the control rods 258, 260 for the opening and closing of the jaws may be controlled, from the vehicle, by any operating means, in particular by a mechanical, electric, hydraulic or pneumatic jack. The control may also be entirely effected from the track by means of automatic stops acting on the control rods 258, 259, 260, 261, on the passing of the vehicle, or it can be mixed, with for example the pairs of jaws being opened from the track, while the closing is operated from the vehicle.

What is claimed is:

1. A transport installation comprising passive vehicles, a track on which the said passive vehicles run, said track having cruising sections and auxiliary sections, a first endless continuously moving haulage cable extending along said cruising sections, a second haulage cable extending along the said auxiliary sections and offset laterally in relation to said first cable, a third haulage cable offset laterally in relation to said first and second cables, guide wheels for the said cables spaced along the track and so arranged as to define the position of the cables in relation to the track, a grip mounted on each vehicle having three pairs of cable gripping jaws mutually laterally offset by a distance corresponding to the lateral offset between the said cables, said jaws functioning to clamp and to couple the vehicle respectively to said first, second and third cables, means interconnecting said pairs of jaws to place one of the said pairs of jaws in the open position when the other pairs are in the closed position and vice versa, said pairs of jaws being disposed in relation to the track at a level different from the level of the guiding of the said cables by the said wheels whereby to allow the free passing by the grips of the said wheels with the extraction of the cable from the said wheels and the extraction of the cable from the said pairs of jaws when these open.

2. A transport installation comprising passive individual vehicles, a track on which the said vehicles run, haulage cables extending along the said track, a grip carried by each vehicle to couple the vehicle on to said cables, said grip having two cheeks mobile in relation to each other, and each having three jaws to form three pairs of jaws of which the jaws of each pair belong to different cheeks, a relative movement in one direction of the said cheeks resulting in the opening of one pair of jaws and the closing to the two others and a movement in the opposite direction resulting inversely in the closing of one pair of jaws and the opening of the two others.

3. A transport installation comprising passive individual vehicles, a track on which said vehicles run, haulage cables extending along the path of said track, a grip carried by each vehicle to couple the vehicle to the said cables said grip having two cheeks mobile in relation to each other, and each having three jaws to form three pairs of jaws of which the jaws of each pair belong to different cheeks, the said grip having in addition a sliding actuating cam with three stable positions, one median position and two extreme positions, the said two cheeks having three positions, a median position in which the three pairs of jaws are open and extreme position in which one pair of jaws is open and two other pairs are closed and an extreme position in which the said one pair of jaws is closed and the said two other pairs are open, and a kinematic chain connecting the said cheeks to the said cam so that the three said positions of the said cheeks correspond respectively with the three said positions of the cam.

4. An installation according to claim 3, the said kinematic chain including an elastic connecting means capable of generating on its elastic distortion the pressure to clamp said jaws onto the cable.

5. An installation according to claim 4, with a torsion bar mounted so as to rotate and forming the said connecting means and a device transforming the rotary movement of the said torsion bar into a movement of translation of the said cheeks to move the jaws in one direction, or the other by rotation of the said bar in one direction or the other.

6. An installation according to claim 5, including an actuating jack with two stable active positions and a connection between the said jack and the said sliding cam making the two said extreme positions of the cam correspond with the said active positions of the cam.

7. A transport installation comprising passive individual vehicles, a track on which said vehicles run, haulage cables extending along the path of said track, a grip carried by each vehicle to couple the vehicle on to the said cables, the said grip having two cheeks mobile in relation to each other, and having each three jaws to form three pairs of jaws of which the jaws of each pair belong to different cheeks, a relative movement in one direction of the cheeks resulting in the opening of one pair of jaws and the closing of the two others and a movement in the opposite direction resulting inversely in the closing of one pair of jaws and the opening of the two others, the said grip having further two kinematic chains with articulated rods and two distinct means of operation, one of the said means being connected by one of the said kinematic chains to the said cheeks to move these in one direction and the other of said means of operation being connected by the other of the said kinematic chains to the said cheeks to move these in the opposite direction, each of the said kinematic chains including two sliders and a knuckle-joint linking the two sliders, the said means of operation being connected with the knuckle-joint, so as to move it to the collapsed or extended position, to approach or separate the said sliders, the movement of the sliders being transmitted to the cheeks.

8. An installation according to claim 7, each of the said kinematic chains including an elastic stop acting in conjunction with one of the said sliders, rockers mounted so as to rotate and articulated rods connecting the other of the said sliders to the said rockers to form a crank device compensating the elastic force variation of the said stop.

9. A transport installation comprising a running track with sections of cruising track, station entrance sections and station exit sections, a cruising haulage cable moving continuously in a path extending along the said cruising track, a decelerating cable extending along the said station entrance sections, an accelerating cable extending along the said station exit section, passive vehicles circulating on the said track, a grip carried by each vehicle, and having three pairs of jaws, a first pair of jaws for coupling the vehicle on to the said haulage cable, a second pair of jaws for coupling the vehicles on to the said decelerator cable, a third pair of jaws for coupling the vehicle on to the accelerating cable, a mechanical liaison between the said pairs of jaws to place the second and third pairs into the open position when the said first pair is in the closed position and to place the said second and third pairs in the closed position when the said first pair is in the open position, a device for guiding the said cables to bring the cable associated with one of the said sections between the said pairs of jaws on the entering of the said section, and to permit the extraction of the cable by opening the pair of jaws at the exit from this section.

* * * * *